United States Patent
Yu et al.

(10) Patent No.: US 7,502,322 B2
(45) Date of Patent: Mar. 10, 2009

(54) SYSTEM, METHOD AND COMPUTER PROGRAM PRODUCT FOR INCREASING THROUGHPUT IN BI-DIRECTIONAL COMMUNICATIONS

(75) Inventors: Jing Yu, San Diego, CA (US); Xuelong Ronald Hu, San Diego, CA (US)

(73) Assignee: Nokia Corporation, Espoo (FI)

( * ) Notice: Subject to any disclaimer, the term of this patent is extended or adjusted under 35 U.S.C. 154(b) by 897 days.

(21) Appl. No.: 10/674,957

(22) Filed: Sep. 30, 2003

(65) Prior Publication Data

US 2005/0068894 A1    Mar. 31, 2005

(51) Int. Cl.
*H04J 1/16*    (2006.01)

(52) U.S. Cl. .................. 370/235; 370/252; 370/338; 714/748

(58) Field of Classification Search ........... 370/229, 370/235, 231, 232, 233, 234, 238, 342, 230, 370/352, 358, 397, 398, 400, 401, 252, 338, 370/395.43, 349; 709/235, 227, 228, 234; 710/60; 714/748
See application file for complete search history.

(56) References Cited

U.S. PATENT DOCUMENTS

| | | | |
|---|---|---|---|
| 6,052,385 A | 4/2000 | Kanerva et al. | |
| 6,215,769 B1 | 4/2001 | Ghani et al. | |
| 6,219,713 B1 * | 4/2001 | Ruutu et al. | 709/235 |
| 6,438,101 B1 * | 8/2002 | Kalampoukas et al. | 370/229 |
| 6,611,495 B1 | 8/2003 | Meyer et al. | |
| 6,760,769 B2 * | 7/2004 | Jayam et al. | 709/228 |
| 2001/0015956 A1 | 8/2001 | Ono | |
| 2002/0071388 A1 | 6/2002 | Bergsson et al. | |
| 2002/0150048 A1 | 10/2002 | Ha et al. | |
| 2003/0103452 A1 | 6/2003 | Le et al. | |
| 2003/0149785 A1 | 8/2003 | Gerla et al. | |

FOREIGN PATENT DOCUMENTS

WO    WO 02/33909 A1    4/2002

OTHER PUBLICATIONS

U.S. Appl. No. 10/758,854, filed Jul. 2005, Addagatla et al.*
Fabienne Lefevre, Guillaume Vivier; *Understanding TCP's behavior over wireless links*; 2000; pp. 123-130; IEEE; XP010542742.

(Continued)

*Primary Examiner*—Chi H Pham
*Assistant Examiner*—Alexander Boakye
(74) *Attorney, Agent, or Firm*—Alston & Bird LLP

(57) ABSTRACT

A system, method, and computer program product are provided for bi-directional communication. The system includes a first host capable of transmitting multiplexed data at a first transmission rate and operating with a first congestion window. The first host is also capable of receiving multiplexed data at a second transmission rate from a second host capable of operating with a second congestion window. The first host can be capable of configuring at least one of a size of the first congestion window and a size of the second congestion window based upon first transmission rate, the size of the second congestion window, the second transmission rate and the size of the first congestion window.

22 Claims, 7 Drawing Sheets

OTHER PUBLICATIONS

A. Calveras, J. Paradells, C. Gomez, M. Catalan, J.C. Valles; *Optimizing TCP parameters over GPRS and WLAN real networks*; Aug. 2003; pp. 663-666; vol. 2; IEEE; XP010660349.

*The Sliding Window Flow Control*; A Tour Around TCP—The Sliding-Window Flow-Control Algorithm; Electrical and Computer Engineering—Chalmers University of Technology; 4 pages; available at <http://www.ce.chalmers.se/~fcela/javis/tcp_slidwin.html> (visited Aug. 18, 2003).

\* cited by examiner

SYSTEM, METHOD AND COMPUTER PROGRAM PRODUCT FOR INCREASING THROUGHPUT IN BI-DIRECTIONAL COMMUNICATIONS

FIELD OF THE INVENTION

The present invention generally relates to systems and methods of bi-directional communication between hosts and, more particularly, relates to systems and methods of bi-directional communication between hosts with increased throughput.

BACKGROUND OF THE INVENTION

Today, an organization's computer network has become its circulatory system. Organizations have combined desktop work stations, servers, and hosts into Local Area Network (LAN) communities. These Local Area Networks have been connected to other Local Area Networks and to Wide Area Networks (WANs). It has become a necessity of day-to-day operation that pairs of systems must be able to communicate when they need to, without regard to where they may be located in the network.

During the early years of network computing, proprietary networking protocols were the standard. However, the development of the Open Systems Interconnection Reference Model introduced by the International Organization for Standardization (ISO) has led to an impressive degree of interworking, which generally allows end-user applications to work very well between systems in a network. Implementations are based on written standards that have been made available by volunteers from dozens of computer vendors, hardware component vendors and independent software companies.

During the last decade, LANs have been proliferating. This has created a recurring problem of how to minimize congestion and optimize throughput that must be solved by network managers. An early solution was to simply divide Local Area Networks into multiple smaller networks serving smaller populations. These segments were connected by bridges to form a single Local Area Network with traffic being segregated locally to each segment.

The evolution of new network types and WANs created a need for routers. For example, the Internet is a set of networks connected by gateways, which are sometimes referred to as routers. Routers added filtering and firewalling capability to provide more control over broadcast domains, limit broadcast traffic and enhance security. A router is able to chose the best path through the network due to embedded intelligence. This added intelligence also allowed routers to build redundant paths to destinations when possible. Nevertheless, the added complexity of best path selection capability accorded by the embedded intelligence increased the port cost of routers and caused substantial latency overhead. Shared-media networks comprising distributed client/server data traffic, expanded user populations and more complex applications gave birth to new bandwidth bottlenecks. Such congestion produced unpredictable network response times, the inability to support the delay-sensitive applications and higher network failure rates.

Congestion control in modern networks is increasingly becoming an important issue. The explosive growth of Internet applications such as the World Wide Web (WWW) has pushed current technology to its limit, and it is clear that faster transport and improved congestion control mechanisms are required. As a result, many equipment vendors and service providers are turning to advanced networking technology to provide adequate solutions to the complex quality of service (QoS) management issues involved. Examples include asynchronous transfer mode (ATM) networks and emerging Internet Protocol (IP) network services. Nevertheless, there is still the need to support a host of existing legacy IP protocols within these newer paradigms. In particular, the ubiquitous TCP transport-layer protocol has long been the workhorse transport protocol in IP networks, widely used by web-browsers, file/email transfer services, etc.

Transmission Control Protocol (TCP) is a part of the TCP/IP protocol family that has gained the position as one of the world's most important data communication protocols with the success of the Internet. TCP provides a reliable data connection between devices using TCP/IP protocols. TCP operates on top of IP that is used for packing the data into data packets, called datagrams, and for transmitting across the network.

The Internet Protocol (IP) is a network layer protocol that routes data across an Internet. The Internet Protocol was designed to accommodate the use of host and routers built by different vendors, encompass a growing variety of growing network types, enable the network to grow without interrupting servers, and support a higher-layer of session and message-oriented services. The IP network layer allows integration of LAN "islands."

However, IP doesn't contain any flow control or retransmission mechanisms. That is why TCP is typically used on top of it. More particularly, TCP uses acknowledgments for detecting lost data packets. TCP/IP networks are nowadays probably the most important of all networks, and operate on top of several (physical) networks, such as the ATM networks mentioned above. These underlying networks may offer some information about the condition of network and traffic, which may be used to provide feedback regarding congestion.

To manage congestion, TCP can use a sliding window mechanism coupled with reactive congestion control to adjust the sender's transmission window size. The protocol adjusts its transmission behavior contingent upon returning acknowledgment (ACK) packets sent from the remote receiver's end.

A problem with TCP, however, is that in certain instances of bi-directional communication between hosts (each functioning as a sender and receiver), the TCP congestion control can be ineffective. More particularly, consider bi-directional communications, such as bi-directional file transfer protocol (FTP) communications, between hosts operating in accordance with TCP, for example. In such an instance, the hosts may communicate over a network, where one of the hosts is coupled to the network via a gateway or access point, where communications across a single path link between the host and the gateway can occur in accordance with a protocol such as the Point-to-Point protocol (PPP). In various instances, the time required for a data packet to travel between the host and the gateway can contribute significantly to the overall time required for the packet to travel from a source host to a destination host. Examples of such a single link can be found in a telephone dial-up modem system between a user terminal and an Internet Service Provider (ISP), and in a Code Division Multiple Access (CDMA) packet data system between a mobile station and the Packet Data Serving Node (PDSN).

In such instances, during communication between the hosts, the data packets from one host (host A) to another host (host B) are typically multiplexed with the ACK packets from host A to host B. In instances in which host A has a larger reception window than host B, a larger portion of the data (i.e., data packets and ACK packets) from host A to host B can backup in host A's transmission window while the smaller reception window of host B processes the data. Backing up a larger portion of the data in the transmission window of host A, however, undesirably delays the ACK packets from reaching host B. And by delaying the ACK packets from reaching host B, data transmission from host B to host A is typically delayed, thus resulting in undesirably slow throughput from host B to host A.

SUMMARY OF THE INVENTION

In light of the foregoing background, embodiments of the present invention provide an improved system, method and computer program product for increasing throughput in bi-directional communications between a pair of TCP hosts over a network system that consists of a bi-directional single path section. To overcome the affects of differing reception windows of the hosts during bi-directional communication, the system, method and computer program product of embodiments of the present invention are capable of configuring the size of a congestion window of one or both of the hosts. In this regard, as explained below, the congestion window of each host can dictate the amount of multiplexed data transmitted before acknowledgement at any given time from the respective host. By configuring the size of the congestion windows, the hosts can bi-directionally communicate without transmission delays due to delayed ACK packets.

According to one aspect of the present invention, a system is provided for bi-directional communication. The system includes a first host, such as host A or host B (described below). The first host is capable of transmitting multiplexed data at a first transmission rate and operating with a first congestion window. The first host is also capable of receiving multiplexed data at a second transmission rate from a second host, such as the other of host A or host B, capable of operating with a second congestion window. For example, the first host can be capable of transmitting multiplexed data comprising first data from the first host and a second acknowledgement to the second host in response to second data from the second host. Also, for example, the first host can be capable of receiving multiplexed data comprising the second data from the second host and a first acknowledgement to the first host in response to the first data from the first host.

Advantageously, the first host is capable of configuring a size of the first congestion window and/or a size of the second congestion window based upon the first transmission rate, the size of the second congestion window, the second transmission rate and the size of the first congestion window. For example, the first host can be capable of configuring the first transmission rate and/or the size of the first congestion window such that the product of the first transmission rate and the size of the second congestion window equals the product of the second transmission rate and the size of the first congestion window.

More particularly, the second host can be capable of receiving multiplexed data into a second reception window from the first host. The first host can then be capable of configuring the size of the first congestion window based upon a maximum size of the first congestion window, where the first host can configure the maximum size of the first congestion window based upon a size of the second reception window.

Like the second host, the first host can be capable of receiving multiplexed data into a first reception window. In such instances, the first host can be capable of configuring the size of the second congestion window based upon a size of the first reception window. For example, the first host can be capable of configuring the size of the second congestion window by first determining a size of the first reception window based upon the maximum size of the first congestion window and the first and second transmission rates. More particularly, the first host can determine the size of the first reception window by multiplying the maximum size of the first congestion window by the second transmission rate and dividing the product by the first transmission rate. After determining the size of the first reception window, then, the first host can transmit multiplexed data to the second host indicating the size of the first reception window such that the second host configures the size of the second congestion window based upon the size of the first reception window.

The first host can be capable of continuously transmitting multiplexed data to and receiving multiplexed data from the second host. To enable the hosts to continuously bi-directionally communicate without transmission delays due to delayed ACK packets, then, the first host can be capable of continuously configuring the size of the first congestion window and/or the size of the second congestion window as the first host transmits and/or receives multiplexed data.

According to other aspects of the present invention, a method and computer program product for bi-directional communication are provided. Therefore, embodiments of the present invention provide systems, methods, and computer program products for bi-directional communication. The system, method and computer program product of embodiments of the present invention are capable of configuring the size of the congestion window directly and/or indirectly according to the both direction transmission rates of the hosts. By configuring the size of their respective congestion windows, the hosts can bi-directionally communicate with reduced delay due to delayed ACK packets from one host to the other. Therefore, the system and method of embodiments of the present invention solve the problems identified by prior techniques and provide additional advantages.

BRIEF DESCRIPTION OF THE DRAWINGS

Figure 1:
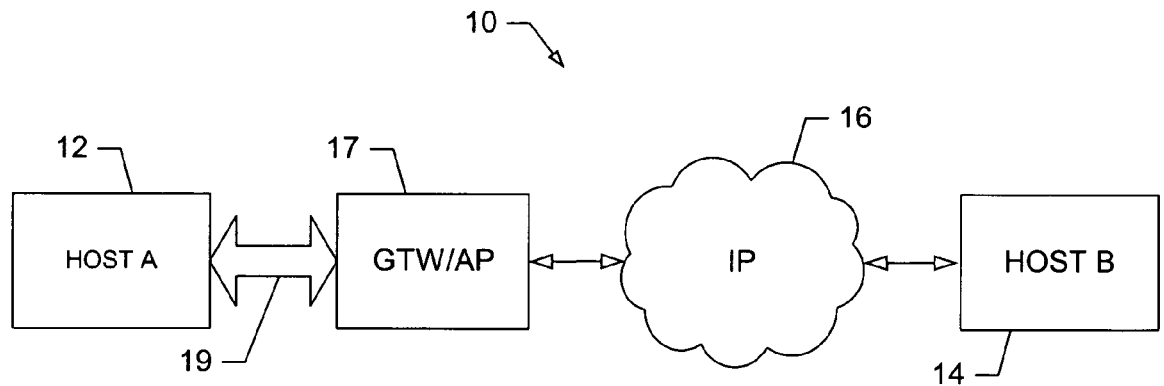
Figure 2:
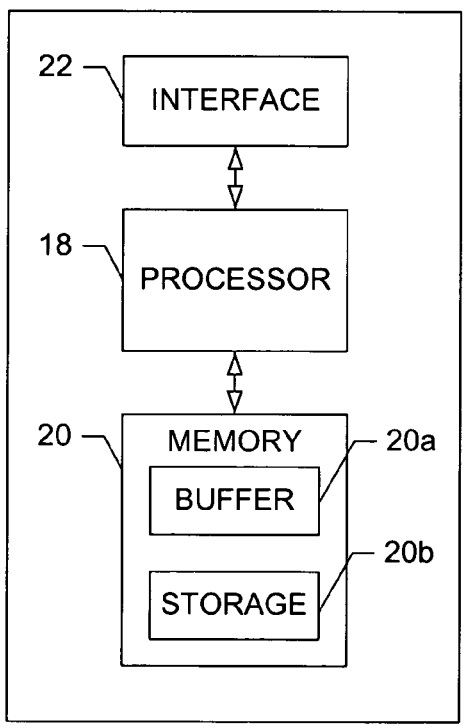
Figure 3:
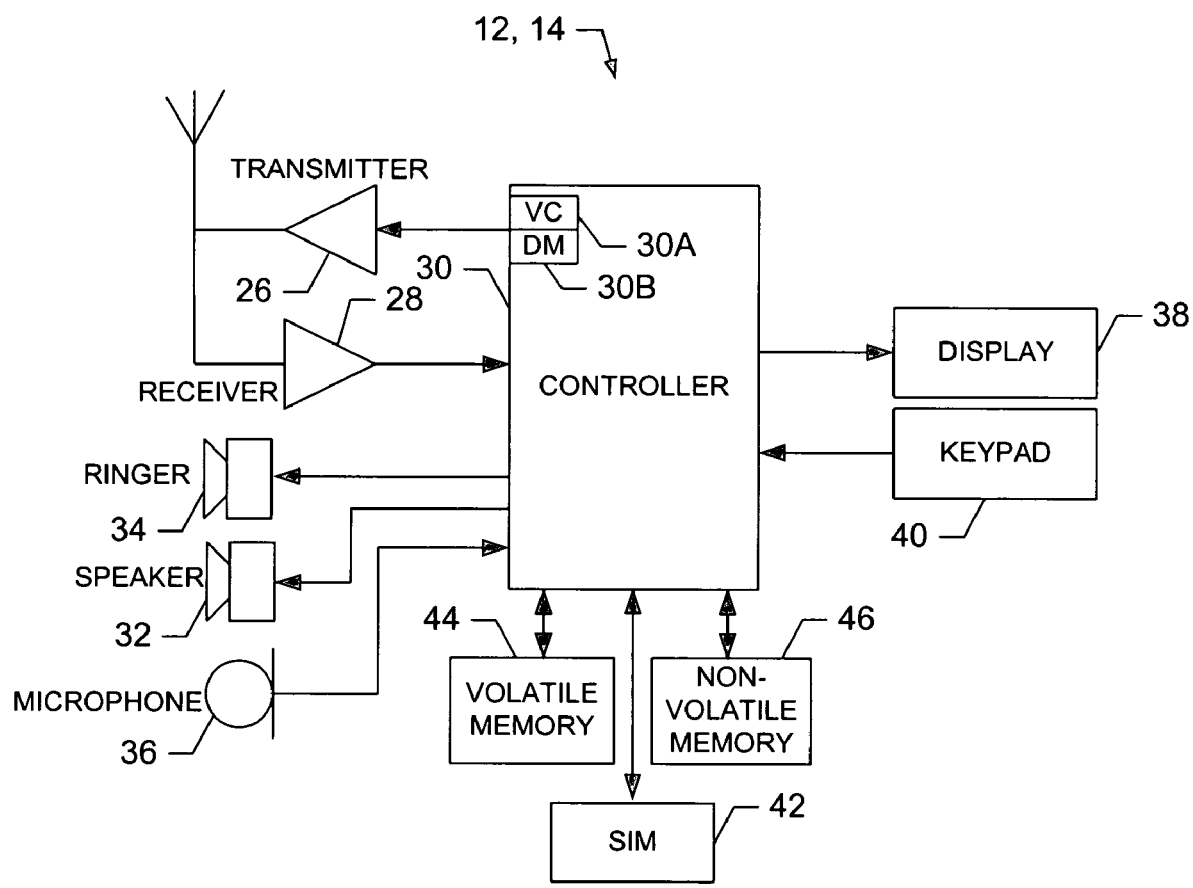
Figure 4:
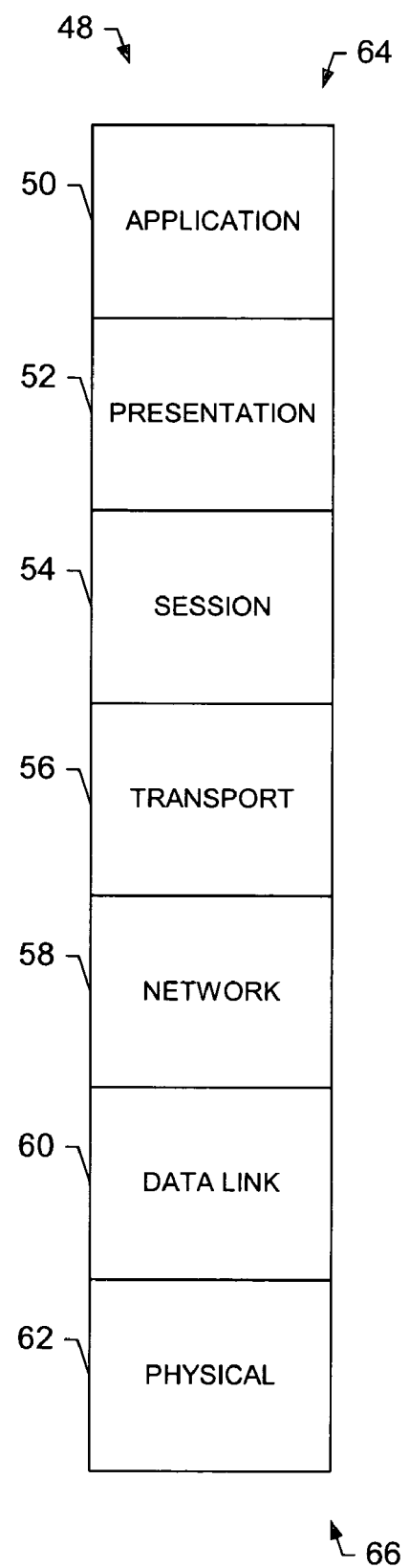
Figure 5:
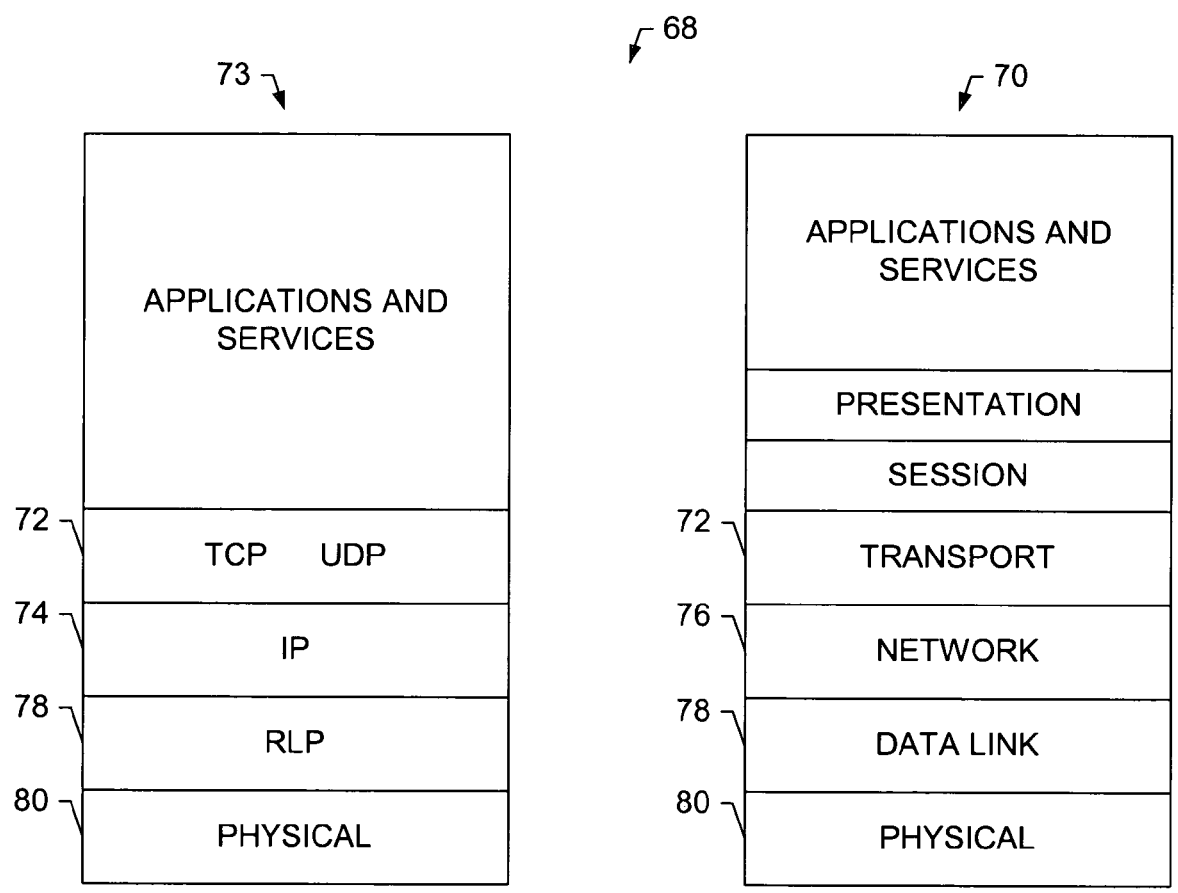
Figure 6:
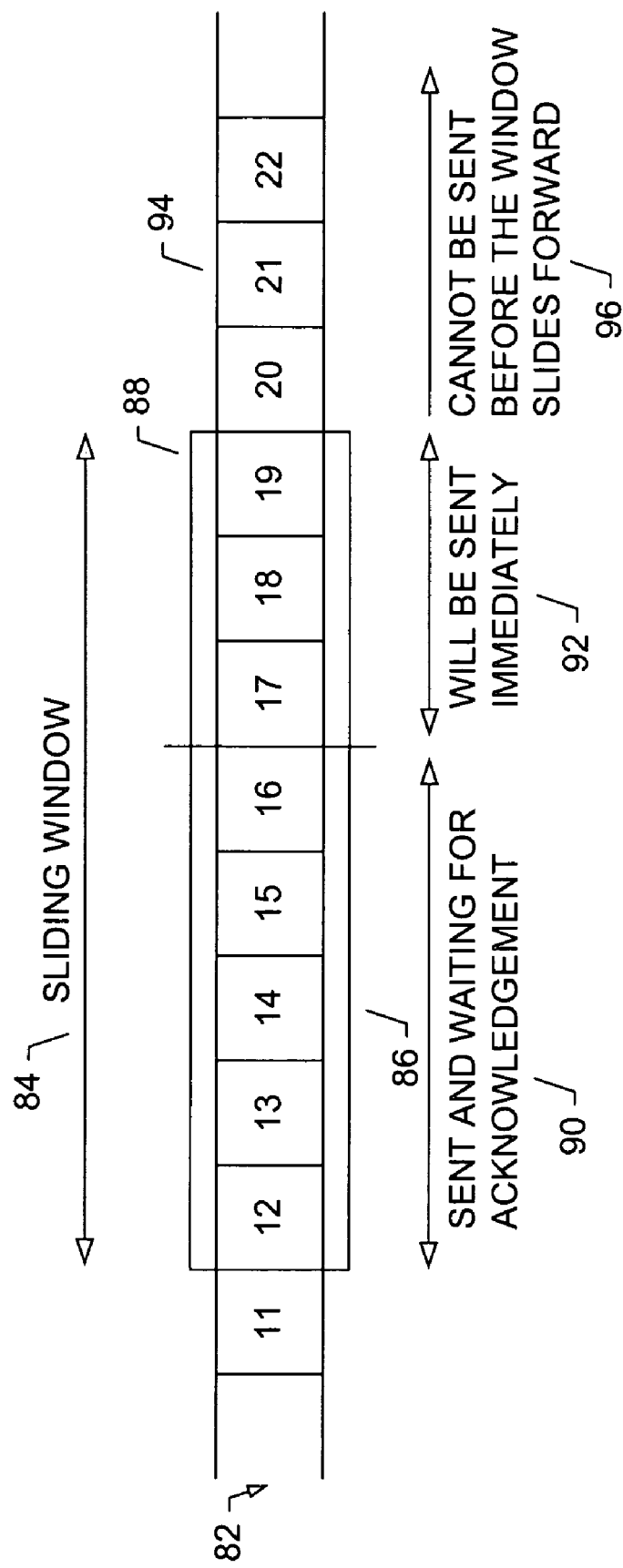
Figure 7:
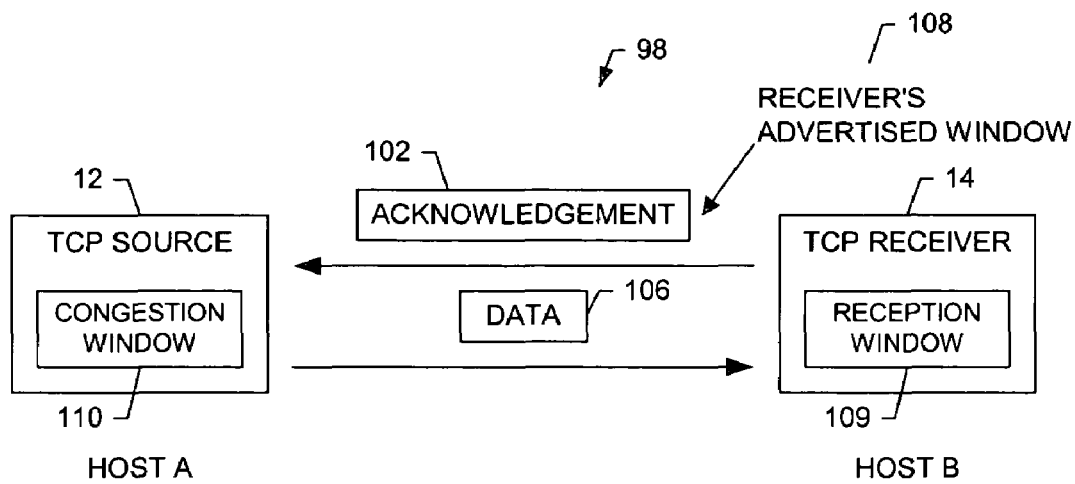
Figure 8:
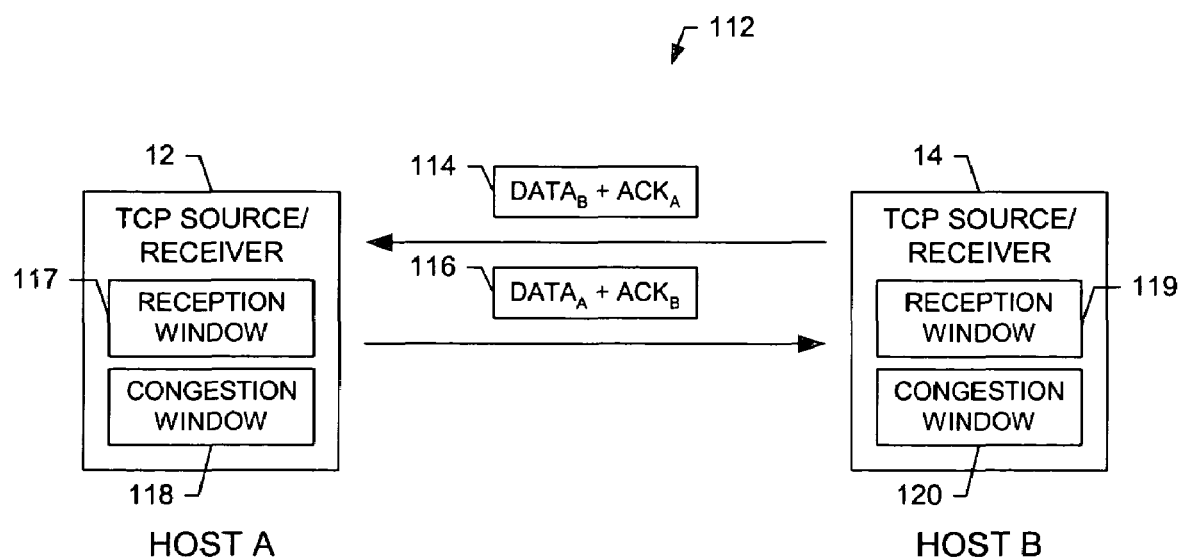
Figure 9:
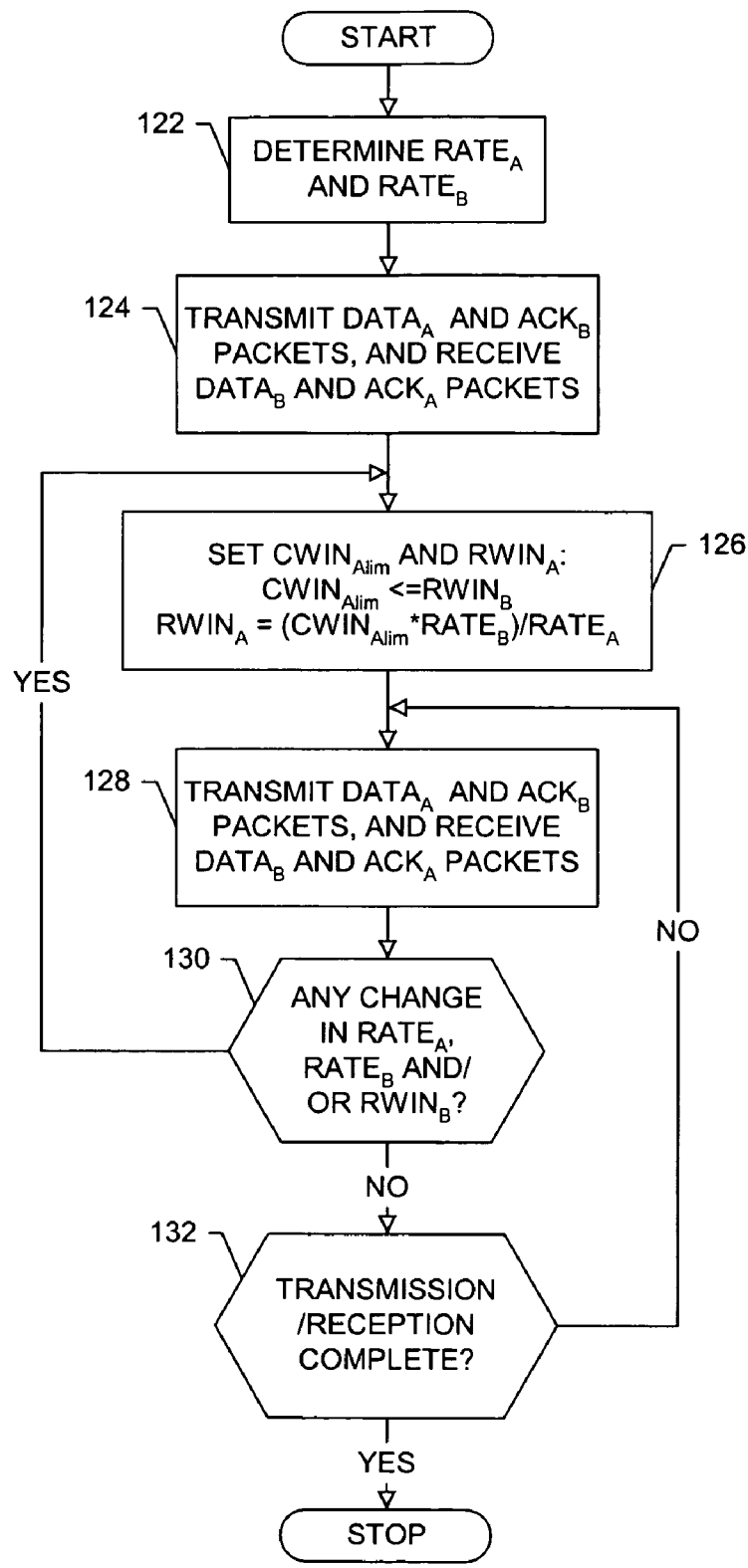

Having thus described the invention in general terms, reference will now be made to the accompanying drawings, which are not necessarily drawn to scale, and wherein:

FIG. 1 shows a system for bi-directionally communicating between two hosts, according to one embodiment of the present invention;

FIG. 2 is a schematic block diagram of a host, according to one embodiment of the present invention;

FIG. 3 is a schematic block diagram of a mobile station that may operate as a host, according to embodiments of the present invention;

FIG. 4 illustrates a multi-layer protocol stack of a host in accordance with one embodiment of the present invention, where the protocol stack comprises the OSI model including seven layers;

FIG. 5 illustrates a comparison of the OSI functionality of a host in accordance with an embodiment of the present invention, and the generic OSI model;

FIG. 6 illustrates a packet stream and a TCP sliding window;

FIG. 7 illustrates a network system where a host uni-directionally communicates with another host;

FIG. 8 illustrates a network system in accordance with embodiments of the present invention where a pair of hosts bi-directionally communicate; and FIG. 9 is a flowchart illustrating various steps in methods of bi-directional communication between a pair of hosts.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a general system 10 is shown for bi-directional communications, according to embodiments of the present invention. The system generally includes two end points or hosts, namely a host A 12 and a host B 14. A host, including host A and host B, may be any device or entity capable of communicating with other hosts via the IP communications network. The hosts can communicate with one another in accordance with any of a number of different wireline and/or wireless techniques, such as the Transmission Control Protocol (TCP). The system also includes a communications network, such as an Internet Protocol (IP) communications network 16 through which host A and host B communicate.

Each of the hosts A 12 and B 14 can be coupled to the network 16 directly, but in one embodiment, one or both of the hosts are coupled to the network via a gateway (GTW) or access point (AP) network entity 17 (referred to as a GTW/AP), with FIG. 1 illustrating host A coupled to the network via such a network entity. For each host coupled to the network via a GTW/AP, the system also typically includes a full-duplex single-path section 19 between the host (e.g., host A) and the GTW/AP. The host can communicate with the GTW/AP in any of a number of different manners, but in one embodiment, communicates in accordance with a Point-to-Point-Protocol (PPP) or other similar protocol, such as the Serial Line Internet Protocol (SLIP). As explained below, however, one characteristic of the system is that the single path section contributes to the TCP round trip time (RTT) significantly.

Referring now to FIG. 2, a block diagram of an entity capable of operating as a host (e.g., host A 12 and/or host B 14) or a GTW/AP 17 is shown in accordance with one embodiment of the present invention. As shown, the entity can generally include a processor 18 connected to a memory 20 and an interface 22. The memory typically includes software applications, instructions or the like for the processor to perform steps associated with operation of the host in accordance with embodiments of the present invention. For example, as a host, the memory may include user or host applications such as a conventional Web browser for communicating in accordance with the hypertext transfer protocol (HTTP), a file transfer (e.g., FTP) application, a Telnet application, a peer-to-peer access application, or the like. Additionally, the memory may include a buffer 20a for implementing a transmission window (described below) and storage 20b for implementing a reception window (described below).

Reference is now drawn to FIG. 3, which illustrates a functional diagram of a mobile station that may act as a host, such as host A 12 and/or host B 14, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 26, a receiver 28, and a controller 30 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA), and/or in accordance with 3G wireless communication protocol CDMA2000. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 30 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 30A, and may include an internal data modem (DM) 30B. Further, the controller may include the functionally to operate one or more software applications, which may be stored in memory.

The mobile station also comprises a user interface including a conventional earphone or speaker 32, a ringer 34, a microphone 36, a display 38, and a user input interface, all of which are coupled to the controller 30. The user input interface, which allows the mobile station to receive data, can comprise any of a number of devices allowing the mobile station to receive data, such as a keypad 40, a touch display (not shown) or other input device. In embodiments including a keypad, the keypad includes the conventional numeric (0-9) and related keys (#, *), and other keys used for operating the mobile station.

The mobile station can also include memory, such as a subscriber identity module (SIM) 42, a removable user identity module (R-UIM) or the like, which typically stores information elements related to a mobile subscriber. In addition to the SIM, the mobile station can include other memory. In this regard, the mobile station can include volatile memory 44, such as volatile Random Access Memory (RAM) including a cache area for the temporary storage of data. The mobile station can also include other non-volatile memory 46, which can be embedded and/or may be removable. The non-volatile memory can additionally or alternatively comprise an EEPROM, flash memory or the like. The memories can store any of a number of pieces of information, and data, used by the mobile station to implement the functions of the mobile station. For example, the memories can store user or host applications such as a conventional Web browser for communicating in accordance with the HTTP, a file transfer (e.g., FTP) application, a Telnet application, a peer-to-peer access application, or the like. Additionally, the memories can store a buffer for implementing a transmission window and storage for implementing a reception window, as such is described below.

FIG. 4 illustrates a protocol stack of a host (e.g., host A 12 and/or host B 14) in accordance with embodiments of the present invention, where the protocol stack may be implemented in software, hardware, firmware or combinations of the same. More particularly, FIG. 4 illustrates the Open Systems Interconnection (OSI) model 48 which includes seven layers, including an application layer 50, presentation layer 52, session layer 54, transport layer 56, network layer 58, data link layer 60 and physical layer 62. The OSI model was developed by the International Organization for Standardization (ISO) and is described in ISO 7498, entitled: *The OSI Reference Model*, the contents of which are incorporated herein by reference in its entirety.

Each layer of the OSI model 48 performs a specific data communications task, a service to and for the layer that precedes it (e.g., the network layer 58 provides a service for the transport layer 56). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In data communication between two hosts (e.g., host A 12 and host B 14), however, each end user is unaware of the envelopes, which perform their functions transparently. For example, an automatic bank teller transaction can be tracked through a host operating in accordance with the multi-layer OSI model, where the host operating in accordance with the multi-layer OSI model may be referred to as an open system or a multiple layer system. In such an instance, one multiple layer system (e.g., Open System A) can provide an application layer that is an interface to a user attempting a transaction, while another multiple layer system (Open System B) can provide an application layer that interfaces with application software in a bank's host computer. The corresponding layers in Open Systems A and B can be referred to as peer layers and communicate through peer protocols. Such peer protocols provide communication support for a user's application, performing transaction-related tasks such as debiting an account, dispensing currency, or crediting an account.

Actual data flow between two open systems (e.g., Open System A and Open System B), however, is from top 64 to bottom 66 in one open system (e.g., Open System A, the source), across the communications line, and then from bottom 66 to top 64 in the open system (e.g., Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source.

Layer 7, the application layer 50, provides for a user application (e.g., getting money from an automatic bank teller machine, etc.) to interface with the OSI application layer. And as indicated above, the OSI application layer can have a corresponding peer layer in another open system communicating with the application layer (e.g., the bank's host computer).

Layer 6, the presentation layer 52, makes sure the user information (e.g., a request for $50 in cash to be debited from a checking account) is in a format (i.e., syntax or sequence of ones and zeros) the destination open system can understand or interpret.

Layer 5, the session layer 54, provides synchronization control of data between the open systems (i.e., makes sure the bit configurations that pass through layer 5 at the source are the same as those that pass through layer 5 at the destination).

Layer 4, the transport layer 56, ensures that an end-to-end connection has been established between the two open systems and is often reliable (i.e., layer 4 at the destination confirms the request for a connection, so to speak, that it has received from layer 4 at the source).

Layer 3, the network layer 58, provides routing and relaying of data through the network (among other things, at layer 3 on the outbound side an address gets placed on the envelope which is then read by layer 3 at the destination).

Layer 2, the data link layer 60, includes flow control of data as messages pass down through this layer in one open system and up through the peer layer in the other open system.

Layer 1, the physical interface layer 62, includes the ways in which data communications equipment is connected mechanically and electrically, and the means by which the data moves across those physical connections from layer 1 at the source to layer 1 at the destination.

FIG. 5 illustrates a comparison 68 of the OSI functionality of host A and/or host B in accordance with embodiments of the present invention, and the generic OSI model. More particularly, FIG. 5 illustrates where the Internet Protocol (IP) network layer 74 fits in the OSI seven layer model 70. As shown, the transport layer 72 provides data connection services to applications and may contain mechanisms that guarantee that data is delivered error-free, without omissions and in sequence. The transport layer in the TCP/IP model 73 sends segments by passing them to the IP layer, which routes them to the destination. The transport layer accepts incoming segments from the IP layer, determines which application is the recipient, and passes the data to that application in the order in which it was sent.

Thus, the IP layer 74 performs network layer functions and routes data between systems. Data may traverse a single link or may be relayed across several links in an Internet. Data is carried in units called datagrams, which include an IP header that contains layer 3 78 addressing information. Routers examine the destination address in the IP header in order to direct datagrams to their destinations. The IP layer is called connectionless because every datagram is routed independently and the IP layer does not guarantee reliable or in-sequence delivery of datagrams. The IP layer routes its traffic without caring which application-to-application interaction a particular datagram belongs to.

The Transmission Control Protocol (TCP) layer 72 provides a reliable data connection between devices using TCP/IP protocols. The TCP layer operates on top of the IP layer 74 that is used for packing the data to data packets, called datagrams, and for transmitting the datagrams across the data link layer and underlying network via physical layer 80. The data link layer can operate in accordance with any of a number of different protocols, such as the Radio Link Protocol (RLP). Like a number of other data link layer protocols, RLP layer 78 provides for retransmission of data in case the receiver did not correctly receive the data. As will be appreciated, the IP protocol doesn't contain any flow control or retransmission mechanisms. That is why the TCP layer 72 and RLP layer 78 are typically used on top of the IP layer 74. In this regard, TCP protocols provide acknowledgments for detecting lost data packets.

FIG. 6 illustrates a packet stream 82 and a TCP sliding transmission window 84, as such may be embodied in memory, such as a buffer 20a (see FIG. 2), of a respective host (e.g., host A 12 and/or host B 14). One of the main features of a TCP source is that it uses a sliding transmission window that determines the bytes and, consequently, the IP packets that can be sent before an acknowledgment is received from the receiver. This makes it possible to adjust the effective transmission rate of the source.

When the TCP source increases the size of the sliding transmission window 84, its average transmission rate also increases. As shown, the sliding window is on top of octets 12-19. Octets up to 11 have been transmitted and the sliding window has moved past them. Inside the sliding window, there are two octet groups 86 and 88. The first octet group 86 includes octets from 12 to 16, which have been transmitted 90. The second group of octets 88 in the sliding window includes octets 17-19, which have not yet been transmitted. The second group of octets can be sent immediately 92. Finally, octets 20 and upwards 94 cannot be transmitted 96. Octet 12 has to be acknowledged and the sliding window slid forward before octet 20 may be transmitted. Thus, TCP provides retransmission of lost data packets and flow control using this TCP sliding window. The sliding window is actually the minimum of the congestion window of the window advertisement which is sent by the receiver, both of which are described below.

FIG. 7 illustrates a TCP network system 98 where a host (e.g., host A 12), operating as a source, uni-directionally communicates with another host (e.g., host B 14), operating as a receiver. As shown, host A provides data 106 to host B, which in turn, provides acknowledgments 102 to host A. As well known to those skilled in the art, host B sends acknowledgment (ACK) packets that include reception window advertisement data 108 informing host A of the capacity of a reception window 109 of host B to handle incoming data. Thus, host B can advertise a suitable reception window size for flow control purposes. In practice, the reception window advertisement specifies how many additional octets of data host B is prepared to accept. Host A can then adjust its sliding window according to this advertisement, unless the congestion window 110 maintained by host A is smaller.

The second window, the congestion window 110, is used internally at the TCP source (e.g., host A 12) for dropping the size of the sliding window. Conventionally the TCP source drops the size of the sliding window if a timer expires telling that a data packet has been sent, but no acknowledgment has arrived within a certain time period. Such an instance can mean that the data packet has been lost which is most probably caused by network congestion. As explained below, however, such an instance can occur in bi-directional communications when the acknowledgement has been delayed at the receiver. To prevent the effects of congestion from increasing, host A drops its transmission rate by reducing the size of the sliding window. The relation of these windows can be expressed as:

TWIN=MIN(peer reception window advertisement, congestion window), where TWIN refers to the transmission window, i.e., the sliding window. In principle, then, the congestion window 110 and feedback information included in the reception window advertisement 102 provided by the underlying network can be used for the same purpose, namely to adjust the transmission rate of the host A according to the load and congestion of the network.

In contrast to the TCP network system 98 of FIG. 7, FIG. 8 illustrates a TCP network system 112 where a host (e.g., host A 12), operating as both a source and receiver, bi-directionally communicates with another host (e.g., host B 14), also operating as both a source and receiver. As shown, host A provides data (Data$_A$) to host B, which in turn, provides an ACK (ACK$_A$) to host A. Similarly, host B provides data (Data$_B$) to host A, which in turn, provides an ACK (ACK$_B$) to host B. In accordance with protocols such as RLP, however, only one transmission path is established in each direction between host A and host B. Thus, host B multiplexes Data$_B$ with ACK$_A$ and thereafter provides the multiplexed data 114 to host A. Likewise, host A multiplexes Data$_A$ with ACK$_B$ and thereafter provides the multiplexed data 116 to host B.

As will be appreciated, both ACK$_A$ and ACK$_B$ typically include reception window advertisement data for the respective host (e.g., host A 12 and host B 14). Each of host A and host B provide window advertisement data informing the other host of the capacity of the reception window of the respective host to handle incoming data, where host A maintains reception window 117 and host B maintains reception window 119. Host A and host B can the adjust their respective sliding transmission windows according to this advertisement, unless the congestion window 110 maintained by the host is smaller. In this regard, host A and host B maintain congestion windows 118 and 120, respectively, that host A and host B use for dropping the size of the sliding transmission window. As before, the sliding transmission window can be expressed as the minimum of the window advertisement and congestion window.

As explained above, the system 10 generally includes a full-duplex single-path communication section 19 between host A 12 and a GTW/AP 17. And as will be appreciated by those skilled in the art, the data and ACK packets are typically buffered in the full-duplex single-path section. As indicated in the background section, this full-duplex single-path section in various instances can operate as a bottleneck of in the data transfer path between host A and host B. In such instances, a significant portion of the round trip time (RTT) of transmissions between hosts A and B can be attributable to this full-duplex single-path section, where the RTT can be defined as the time between sending a data packet and receiving a corresponding ACK. Since this full-duplex single-path section does not have multiple routes through which to separately transmit data and ACK packets, the data and ACK packets are typically buffered in the same first-in-first-out (FIFO) queue in each direction.

The time ($T_{AB}$) required to transmit a data or ACK packet from host A 12 to host B 14, or vice versa, can be represented as a function of the time ($T_{pathAB}$) required to transmit the packet through the full-duplex single-path section 19 between host A and the GTW/AP 17 and the time ($T_{netAB}$) required to transmit the packet between the GTW/AP and host B. More particularly, written notationally, the time required to transmit a data or ACK packet from host A to host B can be represented notationally as follows: $T_{AB}=T_{pathAB}+T_{netAB}$. In various instances, $T_{pathAB}$ is much larger than $T_{netAB}$, i.e., $T_{pathAB}>>T_{netAB}$. In wireless communication, for example, when the congestion window is large enough, $T_{pathAB}$ can reach several seconds, while $T_{netAB}$ is on the order of milliseconds. As can be seen, then, as $T_{pathAB}$ can reach times several hundred times longer than $T_{netAB}$, $T_{netAB}$ can contribute very little to the time ($T_{AB}$) required to transmit a data or ACK packet from host A to host B. Therefore, the time required to transmit a packet between the GTW/AP and host B can be safely ignored when determining $T_{AB}$ such that $T_{AB} \approx T_{pathAB}$.

As previously indicated, in the path from host A 12 to host B 14, a data packet (Data$_A$) from host A to host B, and an acknowledgement (ACK$_B$) from host A to host B for data from host B to host A, are typically buffered in the same FIFO queue. Similarly, in the path from host B to host A, a data packet (Data$_B$) from host B to host A, and an acknowledgement (ACK$_A$) from host B to host A for data from host A to host B, are typically buffered in the same FIFO queue. In this regard, the data and/or ACK packets in each buffer are typically transferred out at the corresponding direction's data transmission rate. The time a data or ACK packet remains in the buffer can be approximately equal to a queue length, or the amount of data in the queue in front of the data or ACK packet, divided by the data transmission rate. For the same amount of data in the queue, then, the data or ACK packet will spend almost the same amount of time in the queue. Since Data$_A$ and ACK$_B$ pass through the same queue, Data$_A$ and ACK$_B$ will typically have the same trip time (i.e., transfer time between host A and host B) if the queue has the same amount of data. It can be shown, then, that the time ($T_{DataA}$) for Data$_A$ to pass from host A to host B equals the time ($T_{ACKB}$) for ACK$_B$ to pass from host A to host B, i.e., $T_{DataA}=T_{ACKB}$. Similarly, the time ($T_{DataB}$) for Data$_B$ to pass from host B to host A equals the time ($T_{ACKA}$) for ACK$_A$ to pass from host B to host A, i.e., $T_{DataB}=T_{ACKA}$.

As indicated above, the RTT can be defined as the time between sending a data packet and receiving a corresponding ACK. In other terms, the RTT can be defined as the sum of the time ($T_{Data}$) required to transmit a data packet from one host (e.g., host A 12) to the other host (e.g., host B 14) and the time ($T_{ACK}$) required to transmit an acknowledgement from the other host (e.g., host B) back to the host (e.g., host A) that transmitted the data packet. Written notationally, then, the RTT$_A$ from host A to host B, and the RTT$_B$ from host B to host A can be represented as follows:

$$RTT_A = T_{DataA} + T_{ACKA},$$

$$RTT_B = T_{DataB} + T_{ACKB}$$

And as indicated above, $T_{DataA} = T_{ACKB}$ and $T_{DataB} = T_{ACKA}$. Thus, it can be shown that $RTT_A = RTT_B$.

As will be appreciated by those skilled in the art, in accordance with protocols such as TCP, if the congestion window of a host is configured such that data transfer from the host to another host occurs without delay, the size of the congestion window (CWIN) can be expressed as follows:

$$CWIN = RTT \times \text{Rate},$$

where "Rate" represents the data transmission rate from the respective host to the other host. Thus, if the congestion windows of hosts A and B 12, 14 were configured such that each transfers data (data packets and ACK packets) to the other host without delay, the congestion window (CWIN$_A$) of host A and congestion window (CWIN$_B$) of host B can be expressed as:

$$CWIN_A = RTT_A \times \text{Rate}_A,$$

$$CWIN_B = RTT_B \times \text{Rate}_B$$

Rearranging the preceding equations, and setting $RTT_A = RTT_B$ from above, then, yields the following expression:

$$CWIN_A \times \text{Rate}_B = CWIN_B \times \text{Rate}_A \quad (1)$$

Therefore, if the product of the congestion window of host A 12 and the transmission rate of host B equals the product of the congestion window of host B 14 and the transmission rate of host A, hosts A and B can bi-directionally communicate with one another without delays caused by reductions in the congestion windows due to delayed receipt of ACK$_A$ or ACK$_B$.

To illustrate of the effect of equation (1) on the transmission of data and ACK packets between hosts A 12 and B 14, consider an instance in which the CWIN of one of the hosts is limited such that $CWIN_A \times \text{Rate}_B \neq CWIN_B \times \text{Rate}_A$. In such an instance, the calculated $RTT_A$ and $RTT_B$ could be different, and therefore, the system RTT can be defined as the larger of the two RTT's. Written notationally, the system RTT ($RTT_S$) can be expressed as follows:

$$RTT_S = \text{MAX}(CWIN_A/\text{Rate}_A, CWIN_B/\text{Rate}_B)$$

When the CWIN and data transmission rate of each host is configured such that equation (1) is satisfied, the system is capable of transmitting data at a system capable rate (Rate$_S$) that is equal in each direction of data transfer. However, when equation (1) is not satisfied, only the host maximizing CWIN/Rate can reach Rate$_S$ as both $RTT_A$ and $RTT_B$ equal $RTT_S$, the larger CWIN/Rate quotient.

Without losing generality, assume that $CWIN_B$ is smaller than that required to satisfy equation (1). In such an instance, $RTT_S > RTT_B = CWIN_B/\text{Rate}_B$. As such, the time required for ACK$_B$ to pass from host A 12 to host B 14 after host B transmits Data$_B$ will exceed $RTT_B$. And because $CWIN_B$ reaches its limit before host B receives ACK$_B$, the size of $CWIN_B$ prevents host B from sending subsequent data packets to host A until after host B receives ACK$_B$. Even though the system 10 has the physical capacity to send data at the rate of Rate$_B$, host B cannot send subsequent data packets until host B receives ACK$_B$. During the waiting period, then, host B is actually idle, thus decreasing Rate$_B$ to a data transmission rate lower than Rate$_S$, the system capable data transmission rate from host B to host A.

From the preceding equation (1), it can be shown that host A 12 and/or host B 14 can determine their respective congestion windows and/or transmission rates such that hosts A and B can bi-directionally communicate without delays caused by reductions in the congestion window due to delayed receipt of ACK$_A$ or ACK$_B$. In accordance with TCP, for example, the CWIN is an internal parameter that can be adjusted based upon ACK responses. In accordance with embodiments of the present invention, to overcome the affects of differing reception windows of hosts A and B, either or both of the hosts is capable of configuring the size of the congestion window 118, 120 of either or both of the hosts based on the transmission rates of the hosts and the size of the congestion window of the other host. Additionally, or alternatively, either or both of the hosts can be capable of configuring the transmission rate of either or both of the hosts based on the sizes of the congestion windows of the hosts and the transmission rate of the other host.

In one embodiment of the present invention, for example, one of the hosts (e.g., host A 12) is capable of directly configuring its respective CWIN (e.g., $CWIN_A$ 118), and/or indirectly configuring the CWIN (e.g., $CWIN_B$ 120) of the other host (e.g., host B 14). For purposes of illustration, and without loss of generality, the following will describe host A as configuring one or both of $CWIN_A$ and $CWIN_B$. It should be understood, however, that host B could equally be capable of configuring one or both of $CWIN_A$ and $CWIN_B$.

More particularly, in accordance with one embodiment of the present invention, host A can obtain or otherwise determine the data transmission rates $Rate_A$ and $Rate_B$, such as in accordance with any of a number of known techniques. Host A 12 can then determine a size limit ($CWIN_{Alim}$) of its congestion window based upon the size of the reception window ($RWIN_B$) of host B 14. As will be appreciated, $CWIN_{Alim}$ is typically smaller than $RWIN_B$, otherwise $CWIN_A$ would not be capable of reaching $CWIN_{Alim}$. Thus, the size of the congestion window of host A can be configured as follows:

$$CWIN_A = \text{MIN}(CWIN_{Alim}, RWIN_B)$$

After host A has determined $CWIN_{Alim}$, host A can transmit an $ACK_B$ to host B that includes window advertisement data informing the host B of the size of the reception window ($RWIN_A$) of host A. In this regard, $RWIN_A$ can be determined in accordance with the following equation (2):

$$RWIN_A = \frac{CWIN_{Alim} \times Rate_B}{Rate_A} \quad (2)$$

By transmitting window advertisement data to host B indicating $RWIN_A$, host A can be capable of indirectly configuring $CWIN_B$, such as in the same manner as $CWIN_A$ is configured based upon $RWIN_B$.

In accordance with TCP, just as $CWIN_A$ can be limited by $RWIN_B$, $CWIN_B$ can be limited by $RWIN_A$. When the hosts A 12 and B 14 transmit and receive data and ACK packets in a steady state, then, $CWIN_A$ can reach a maximum size that is approximately equal to $CWIN_{Alim}$. Similarly, $CWIN_B$ can reach a maximum size that is approximately equal to $RWIN_A$. In notational terms, then, $CWIN_A$ and $CWIN_B$ can be represented as follows in equations (3) and (4):

$$CWIN_A \approx CWIN_{Alim} \quad (3)$$

$$CWIN_B \approx RWIN_A \quad (4)$$

By rearranging equation (2) and substituting equations (3) and (4) into the rearranged equation (2), the resulting can be expressed as follows:

$$CWIN_A \times Rate_B \approx CWIN_B \times Rate_A$$

As can be seen, the preceding equation is the approximate equivalent of equation (1). And as such, by determining $CWIN_{Alim}$, and by determining and advertising $RWIN_A$, host A can configure the bi-directional communication such that the communication does not incur delays caused by reductions in the congestion windows due to delayed receipt of $ACK_A$ or $ACK_B$.

Reference will now be made to FIG. 9, which illustrates a method of bi-directionally communicating between two hosts in accordance with one embodiment of the present invention. As above, for purposes of illustration, and without limitation, the following will describe host A as configuring one or both of $CWIN_A$ and $CWIN_B$. As shown, a method of bi-directional communicating between host A 12 and host B 14 generally includes host A obtaining or otherwise determining the data transmission rates $Rate_A$ and $Rate_B$, as shown in block 122. Host A can determine the transmission rates in accordance with any of a number of different techniques. For example, in the context of a dial-up Digital Subscriber Line (DSL) communication, the data rates can be obtained from communication (e.g., modem) settings at host A. Also, for example, in the context of CDMA 2000 communication, the respective rates can be obtained from system capabilities.

Either before, after or as host A 12 determines $Rate_A$ and $Rate_B$, hosts A and B can begin transmitting and receiving data and ACK packets with given reception windows 117, 119, congestion windows 118, 120 and transmission rates. As shown in block 124, then, host A transmits $Data_A$ and $ACK_B$ packets at a given $Rate_A$, and similarly, host B transmits $Data_B$ and $ACK_A$ packets at a given $Rate_B$, and receives $Data_A$ and $ACK_B$ packets. Initially, hosts A and B typically transmit and receive data and ACK packets with default settings, such as default TCP settings, for the respective reception (RWIN) and congestion (CWIN) windows. Then, after at least one data packet has been transmitted and at least one ACK packet has been returned based upon the default settings, host A can set $CWIN_{Alim}$ such that $CWIN_{Alim} \leq RWIN_B$, as shown in block 126. For example, host A can set $CWIN_{Alim}$ such that $CWIN_{Alim} = RWIN_B$.

As also shown in block 126, host A 12 can also determine and set $RWIN_A$, and thus reception window advertisement data indicating $RWIN_A$, such as in accordance with equation (2). Thus, host A can limit $CWIN_A$ by $CWIN_{Alim}$, and can send reception window advertisement data to host B in $ACK_B$ packets, where the reception window advertisement data indicates $RWIN_A$. In response to the reception window advertisement data, then, host B 14 can set $CWIN_B$. By determining $CWIN_A$ based upon $CWIN_{Alim}$, and determining $RWIN_A$ to thereby dictate $CWIN_B$, hosts A and B can communicate in a manner that satisfies equation (1), as shown in block 128.

As hosts A and B communicate, A can repeatedly determine whether any one or more of $Rate_A$, $Rate_B$ and $RWIN_B$ change, as shown in block 130. If any one or more of $Rate_A$, $Rate_B$ and $RWIN_B$ do change during communication between hosts A and B, host A can again set $CWIN_{Alim}$ and/or $RWIN_A$, such as in the same manner as before (see block 126). Thus, hosts A and B can continuously communicate in a manner such that the communication does not incur delays caused by reductions in the congestion windows due to delayed receipt of $ACK_A$ or $ACK_B$. The communication between hosts A and B, and determination as to whether any one or more of $Rate_A$, $Rate_B$ and $RWIN_B$ change can continue, such as until the hosts A and B complete the transmission and reception of data and ACK packets, as shown in block 132. Thus, hosts A and B can bi-directionally communicate without delays caused by reductions in the congestion window due to delayed receipt of $ACK_A$ or $ACK_B$.

According to one aspect of the present invention, all or a portion of the system of the present invention, such all or portions of host A 12 and/or host B 14, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 9 is a flowchart of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor configured to transmit multiplexed data at a first transmission rate and operate with a first congestion window, wherein the processor is also configured to receive multiplexed data at a second transmission rate from a second host separate from the apparatus and configured to operate with a second congestion window, and wherein the processor is configured to set at least a size of the second congestion window based upon the first transmission rate, the size of the second congestion window, the second transmission rate and the size of the first congestion window.

2. An apparatus according to claim 1, wherein the processor is configured to set at least a size of the second congestion window such that a product of the first transmission rate and the size of the second congestion window approximately equals a product of the second transmission rate and the size of the first congestion window.

3. An apparatus according to claim 1, wherein the second host is configured to receive multiplexed data into a second reception window from the processor, wherein the processor is configured to set a size of the first congestion window based upon a maximum size of the first congestion window, and wherein the processor is configured to set the maximum size of the first congestion window based upon a size of the second reception window.

4. An apparatus according to claim 1, wherein the processor is configured to receive multiplexed data into a first reception window, and wherein the processor is configured to set the size of the second congestion window based upon a size of the first reception window.

5. An apparatus according to claim 4, wherein the processor being configured to set the size of the second congestion window includes being configured to:
determine a size of the first reception window based upon a maximum size of the first congestion window and the first and second transmission rates; and
transmit multiplexed data to the second host indicating the size of the first reception window such that the second host configures the size of the second congestion window based upon the size of the first reception window.

6. An apparatus according to claim 5, wherein the processor being configured to determine a size of the first reception window includes being configured to multiply the maximum size of the first congestion window by the second transmission rate and dividing the product by the first transmission rate.

7. An apparatus according to claim 1, wherein the processor is configured to continuously transmit multiplexed data and receive multiplexed data from the second host, and wherein the processor is configured to continuously set at least the size of the second congestion window.

8. An apparatus according to claim 1 further comprising:
a memory connected to the processor and configured to store at least a portion of the multiplexed data.

9. A method of bi-directional communication between a first host and a separate, second host, the method comprising:
transmitting multiplexed data at a first transmission rate from the first host operating with a first congestion window;
receiving multiplexed data at a second transmission rate from the second host operating with a second congestion window; and
configuring at the first host at least a size of the second congestion window based upon the first transmission rate, the size of the second congestion window, the second transmission rate and the size of the first congestion window.

10. A method according to claim 9, wherein configuring at least the size of the second congestion window comprises configuring at least the size of the second congestion window such that a product of the first transmission rate and the size of the second congestion window approximately equals a product of the second transmission rate and the size of the first congestion window.

11. A method according to claim 9, wherein the second host is capable of receiving multiplexed data into a second reception window from the first host, wherein configuring a size of the first congestion window comprises configuring a size of the first congestion window based upon a maximum size of the first congestion window, and wherein configuring a maximum size of the first congestion window comprises configuring a maximum size of the first congestion window based upon a size of the second reception window.

12. A method according to claim 9, wherein receiving multiplexed data comprises receiving multiplexed data into a first reception window, and wherein configuring a size of the second congestion window comprises configuring a size of the second congestion window based upon a size of the first reception window.

13. A method according to claim 12, wherein configuring a size of the second congestion window comprises:
determining a size of the first reception window based upon a maximum size of the first congestion window and the first and second transmission rates; and transmitting multiplexed data to the second host indicating the size of the first reception window such that the second host configures the size of the second congestion window based upon the size of the first reception window.

14. A method according to claim 13, wherein determining a size of the first reception window comprises determining a size of the first reception window by multiplying the maximum size of the first congestion window by the second transmission rate and dividing the product by the first transmission rate.

15. A method according to claim 9, wherein transmitting multiplexed data and receiving multiplexed data comprise continuously transmitting multiplexed data and receiving multiplexed data, respectively, and wherein configuring at least a size of the second congestion window comprises continuously configuring at least a size of the second congestion window.

16. A computer-readable storage medium having computer-readable program code portions stored therein, the computer-readable program code portions comprising:
   a first executable portion for transmitting multiplexed data at a first transmission rate from a first host operating with a first congestion window, the first host being configured to bi-directionally communicate with a separate, second host;
   a second executable portion for receiving multiplexed data at a second transmission rate from the second host operating with a second congestion window; and
   a third executable portion for configuring at the first host at least a size of the second congestion window based upon the first transmission rate, the size of the second congestion window, the second transmission rate and the size of the first congestion window.

17. A computer-readable storage medium according to claim 16, wherein the third executable portion is configured to set at least the size of the second congestion window such that a product of the first transmission rate and the size of the second congestion window approximately equals a product of the second transmission rate and the size of the first congestion window.

18. A computer-readable storage medium according to claim 16, wherein the second host is capable of receiving multiplexed data into a second reception window from the first host, wherein the third executable portion is configured to set the size of the first congestion window based upon a maximum size of the first congestion window, and wherein the third executable portion is configured to set the maximum size of the first congestion window co based upon a size of the second reception window.

19. A computer-readable storage medium according to claim 16, wherein the first executable portion is configured to receive multiplexed data into a first reception window, and wherein the third executable portion is configured to set the size of the second congestion window based upon a size of the first reception window.

20. A computer-readable storage medium according to claim 19, wherein the third executable portion being configured to set the size of the second congestion includes being configured to:
   determine a size of the first reception window based upon a maximum size of the first congestion window and the first and second transmission rates; and
   transmit multiplexed data to the second host indicating the size of the first reception window such that the second host sets the size of the second congestion window based upon the size of the first reception window.

21. A computer-readable storage medium according to claim 20, wherein the third executable portion is configured to determine a size of the first reception window by multiplying the maximum size of the first congestion window by the second transmission rate and dividing the product by the first transmission rate.

22. A computer-readable storage medium according to claim 16, wherein the first and second executable portions are configured to continuously transmit multiplexed data and receive multiplexed data, respectively, and wherein the third executable portion is configured to continuously set at least a size of the second congestion window.

\* \* \* \* \*